United States Patent Office 3,122,185
Patented Feb. 25, 1964

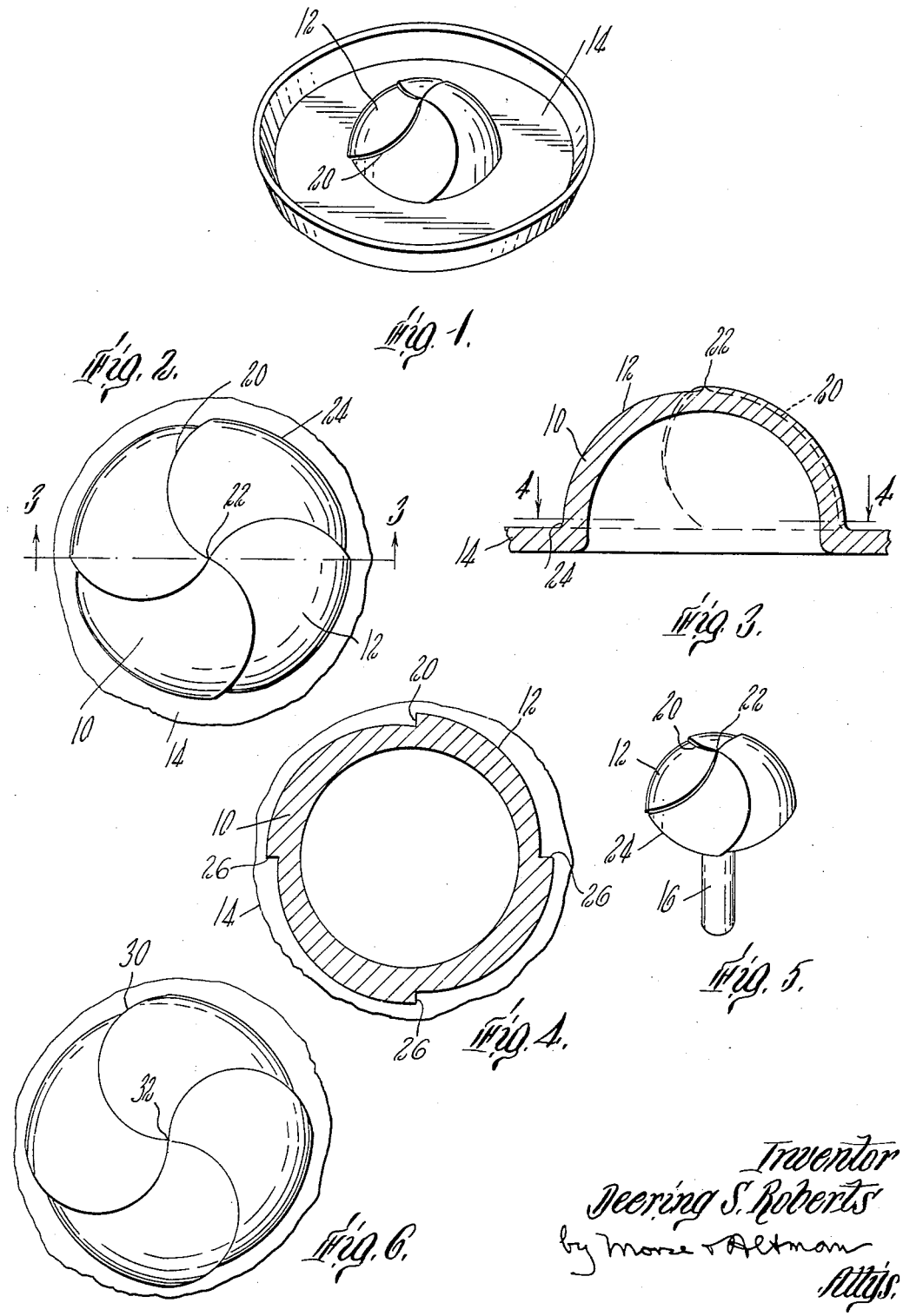

1

3,122,185
FRUIT REAMER
Deering S. Roberts, 1068 Porter Drive, Largo, Fla.
Filed Oct. 6, 1960, Ser. No. 60,978
2 Claims. (Cl. 146—3)

This invention relates to a reamer for fruit, especially citrous fruit such as oranges and grapefruit. It is an object of the invention to provide a reamer which will quickly and effectively remove the juice and pulp from a halved orange with minimum disturbance of the membranes wihch envelop the individual sections of an orange. When extracting the juice from an orange, it is desirable to perform the operation as quickly and completely as possible without tearing loose any of the parchment-like membranes which enclose individual sections of the orange. To accomplish this result, an improved reamer is provided as hereinafter described. Embodiments of the invention are illustrated on the drawing, of which FIGURE 1 is a perspective view of the improved reamer with a receptacle to catch the juice;

FIGURE 2 is a plan view of the reamer shown in FIGURE 1;

FIGURE 3 is a section on the line 3—3 of FIGURE 2;

FIGURE 4 is a section on the line 4—4 of FIGURE 3;

FIGURE 5 is a perspective view of the improved reamer mounted on a vertical shaft without a receptacle; and FIGURE 6 is a plan view of a modified form of the invention.

As oranges are generally spherical in shape, or nearly so, the reamer 10 shown on the drawing is preferably hemispherical to accommodate half an orange. The hemisphere may be hollow, as indicated in FIGURE 3, or solid, the significant feature being the approximately hemispherical surface 12 it presents for contact with the fruit. The reamer may be within and a part of a bowl or receptacle 14 to catch the juice and pulp extracted from the fruit, or may be mounted on the end of a vertical shaft 16 to be rotated thereby. In either case there is relative rotation between the reamer and the fruit.

According to the invention the hemispherical surface 12 is modified by the formation of one or more abrupt shoulders 20 which extend from the pole 22 of the hemisphere to its equator 24 and which follow spiral paths each of which is tangent to a meridian at the pole but curves increasingly away from such meridian until it reaches the equator. If meridians be considered as being 1° apart, each shoulder 20 in the form of the invention shown in FIGURES 1 to 5 cuts about forty-five meridians, that is, the meridian at the lower end of each shoulder 20 makes an angle of about 45° with the meridian which is tangent to the shoulder at the pole 22.

The paths of the shoulders 20, however, can be otherwise curved. For example, the shoulders 30 indicated in FIGURE 6 curve more sharply and cut more meridians than those shown in FIGURE 2. The meridian at the lower end of each shoulder 30 makes an angle of about 90° with the meridian which is tangent to that shoulder at the pole 32.

The faces of the shoulders 20, as indicated in FIGURE 4, are at any point of intersection with the hemispherical surface perpendicular to the hemispherical surface at that point, forming 90-degree edges 26 at the outer boundary of each shoulder. The shoulders 20 or 30 may be undercut, if desired, so that the edges at their outer boundaries are less than 90°.

In the operation of the reamer, a half-orange is applied thereto with relative rotation. The shoulders 20 progressively press against the pulp of the orange and as the reamer moves into the interior of the half-orange, the lower portions of the shoulders have an increasingly wiping action which results in a quick and thorough expulsion of the juice and pulp from the orange.

Various further modifications and changes in the examples herein illustrated and described may be made without departing from the scope of the invention as defined in the following claims.

I claim:

1. A fruit reamer having an approximately hemispherical surface including a plurality of abrupt shoulders extending from the pole of the hemisphere to the equator thereof, each of said shoulders following a path tangent to a meridian at the pole and curving increasingly away from such meridian until they reach the equator, the faces of said shoulders at any point of their intersection with said hemispherical surface making an angle of not over 90° therewith.

2. A fruit reamer having an approximately hemispherical surface including four abrupt shoulders extending from the pole of the hemisphere to the equator thereof and angularly spaced from one another, each of said shoulders following a path tangent to a meridian at the pole and curving increasingly away from such meridian until they reach the equator, each of said shoulders reaching the equator at a point on a meridian which makes a right angle with its corresponding tangent meridian, the faces of said shoulders at any point of their intersection with said hemispherical surface making an angle of not over 90° therewith.

References Cited in the file of this patent

UNITED STATES PATENTS 1,411,813    Stein _____ Apr. 4, 1922

FOREIGN PATENTS 109,884    Australia _____ Feb. 21, 1940
412,270    Italy _____ Nov. 19, 1945
143,988    Sweden _____ Feb. 9, 1954